United States Patent [19]

Kinoshita et al.

[11] Patent Number: 5,589,541
[45] Date of Patent: Dec. 31, 1996

[54] PROCESS FOR PRODUCING MODIFIED PROPYLENE POLYMER AND MODIFIED PROPYLENE POLYMER COMPOSITION

[75] Inventors: Masafumi Kinoshita; Toshio Niwa; O. Shibata, all of Osaka, Japan

[73] Assignee: Dainippon Ink and Chemicals Inc., Tokyo, Japan

[21] Appl. No.: 413,218

[22] Filed: Mar. 28, 1995

[30] Foreign Application Priority Data

Mar. 28, 1994 [JP] Japan ................................ 6-57116
Oct. 12, 1994 [JP] Japan ................................ 6-246170

[51] Int. Cl.$^6$ ........................... C08F 255/02; C08L 51/06
[52] U.S. Cl. ........................... 525/66; 525/64; 525/68; 525/285; 525/286; 525/322
[58] Field of Search ........................... 525/285, 322, 525/64, 66, 68, 286

[56] References Cited

U.S. PATENT DOCUMENTS

| | | | |
|---|---|---|---|
| 3,375,300 | 3/1968 | Ropp | 260/857 |
| 4,097,554 | 6/1978 | Yui | 260/878 R |
| 5,140,074 | 8/1992 | DeNicola | 525/263 |
| 5,409,991 | 4/1995 | Mitsuno | 525/66 |

*Primary Examiner*—Vasu S. Jagannathan
*Attorney, Agent, or Firm*—Armstrong, Westerman, Hattori, McLeland & Naughton

[57] ABSTRACT

A process for producing a modified propylene polymer comprising the steps of premixing a propylene polymer with a vinyl monomer and polymerizing the vinyl monomer by kneading the premix at a temperature of a melting point thereof or higher is described, wherein the propylene polymer is a particulate propylene polymer having a specific surface area of 0.1 m$^2$/g or more. A modified propylene polymer composition is also described, obtained by mixing (a) a particulate propylene polymer having a specific surface area of 0.1 m$^2$/g or more, (b) 5% by weight or more of a vinyl monomer mainly comprising an aromatic vinyl monomer based on the total weight of the vinyl monomer and the propylene polymer, and (c) a radical polymerization initiator, substantially impregnating the vinyl monomer and the radical polymerization initiator into the propylene polymer, and then polymerizing the vinyl monomer by melt-kneading.

20 Claims, 1 Drawing Sheet

PROCESS FOR PRODUCING MODIFIED PROPYLENE POLYMER AND MODIFIED PROPYLENE POLYMER COMPOSITION

FIELD OF THE INVENTION

The present invention relates to a process for producing a modified propylene polymer with an increased amount derived from a vinyl monomer, which is excellent in transparency, rigidity and extrusion moldability, moreover the process which has a high polymerization rate and a high graft ratio of the vinyl monomer, wherein the vinyl monomer is easily impregnated into the propylene polymer at ambient temperature, and the propylene polymer exhibits excellent processability in reactive extrusion. More particularly, the present invention relates to a process for producing a modified propylene polymer which is excellent in rigidity and is useful as packaging and vessel materials.

BACKGROUND OF THE INVENTION

Polypropylene is widely used for various purposes in the form of film, fiber, and molded articles because of its low cost of production, high mechanical strength, high heat resistance, high oil resistance, and excellent electrical characteristics.

However, polypropylene is inferior to other vinyl polymers, especially polystyrene, in rigidity, processability in sheeting, and surface characteristics. In the field of packaging vessels, for example, polypropylene is less rigid and less processable in sheeting than polystyrene but, on the other hand, superior to polystyrene in heat resistance, oil resistance, and moisture resistance. Accordingly, a molding material having the merits of polypropylene combined with those of polystyrene in good balance would find new uses in the fields where each resin has been inapplicable.

Blending polypropylene with polystyrene or polymerization of styrene in the presence of a propylene polymer has been attempted. For example, U.S. Pat. No. 4,097,554 discloses modified polypropylene obtained by polymerizing a styrene monomer in an aqueous suspension in the presence of a propylene polymer. U.S. Pat. No. 5,140,074 discloses modified polypropylene obtained by activating a particulate propylene polymer with a peroxide and polymerizing a styrene monomer in the presence of the activated propylene polymer in a solid phase system under such conditions that the propylene polymer may retain the particle form.

However, polypropylene and polystyrene are incompatible with each other. When these resins are merely blended, the polystyrene shows insufficient dispersibility and undergoes phase separation due to poor interfacial adhesion between the two resins, only to provide molded articles which are unsatisfactory in transparency, rigidity, impact resistance and the like and are therefore unsuited to practical use. When a styrene monomer is polymerized in an aqueous suspension system or a solid phase system in the presence of a particulate propylene polymer, the production steps required for, for example, prevention of blocking, control of polymerization temperature, and drying of a product are complicated, which has made it infeasible to industrialize the product as a general-purpose polymer.

Thus, conventional techniques for introducing a styrene polymer into a propylene polymer are unsatisfactory from the standpoint of the polymer property and the process thereof. The drawback of the conventional techniques is ascribed to insufficient dispersion of polystyrene in a propylene polymer. While a styrene-grafted propylene polymer is desirable for obtaining a sufficient disperse system of polystyrene in propylene polymer, it is difficult to form a graft polymer by the above-mentioned processes probably because of the high crystallinity of polypropylene, which means primarily a high melting point and secondarily insolubility in a styrene monomer.

In the study on modified propylene polymers with improved transparency, rigidity and moldability, the present inventors previously found that an aromatic vinyl monomer-grafted polymer excellent in various properties can be obtained by a process basically comprising polymerization of an aromatic vinyl monomer in the presence of a molten propylene polymer in, e.g., an extruder and that the process is easy to carry out on an industrial scale (JP-A-4-359910, JP-A-5-155947, and JP-A-5- 239158, the term "JP-A" as used herein means an "unexamined published Japanese patent application").

However, as a result of further study, the above process turned out to involve the following disadvantage. That is, when a propylene polymer is fed to an extruder and the like and melted, while a vinyl monomer is fed to the middle of the extruder by means of a pump and melt-kneaded with the molten propylene polymer and polymerized, infiltration of the vinyl monomer into the propylene polymer at ambient temperature is insufficient. As a result, the propylene polymer cannot be smoothly fed to the extruder, or the resulting modified propylene polymer shows insufficient compatibility.

When a propylene polymer and a vinyl monomer are premixed and then melt-kneaded and polymerized in an extruder, it takes time for the vinyl monomer to be infiltrated into the propylene polymer at ambient temperature. If the propylene polymer is used in a form having a small specific surface area, such as a form of pellets, the vinyl monomer is not sufficiently adsorbed onto the propylene polymer, tending to separate and run off the blend, or the premix fed to an extruder tends to slide on the screw and fails to bite, namely, poor reactive processability during extrusion (hereinafter referred to as reactive extrusion processability). It follows that the vinyl monomer cannot achieve a high polymerization rate and a high graft ratio, and that the resulting modified propylene polymer cannot have a high proportion of a component derived from the vinyl monomer and is inferior in uniformity and transparency.

SUMMARY OF THE INVENTION

Accordingly, an object of the present invention is to provide a process for producing a modified propylene polymer, in which an impregnation ability of a vinyl monomer into a propylene polymer is improved, and the propylene polymer exhibits excellent reactive extrusion processability in an extruder, that is, the polymer can be smoothly fed to an extruder, so that the vinyl monomer achieves a high polymerization rate and a high graft ratio to provide a modified propylene polymer having an increased proportion of a component derived from the vinyl monomer.

Another object of the present invention is to provide a modified propylene polymer composition having a large proportion of a component derived from a vinyl monomer which is excellent in transparency, rigidity and moisture permeability and is useful as food packaging materials or packaging vessel materials.

The present inventors have conducted extensive investigations into a process for producing a vinyl-modified propylene polymer and, as a result, found that a propylene polymer having a specific surface area allows a vinyl monomer to be adsorbed and impregnated more easily to provide a premix having a higher vinyl monomer content. When the premix is subjected to reaction processing, i.e., fed to an extruder and melt-kneaded to polymerize the vinyl monomer, the propylene polymer exhibits improved reactive extrusion processability (i.e., excellent properties on being fed to a continuous kneading machine such as an extruder), and the vinyl monomer achieves a high polymerization rate and a high graft ratio thereby to provide a modified propylene polymer having a high proportion of a vinyl monomer-derived component and well-balanced physical properties.

These and other objects of the present invention have been attained by a process for producing a modified propylene polymer comprising the steps of premixing a propylene polymer with a vinyl monomer and polymerizing the vinyl monomer by kneading the premix at a temperature of a melting point thereof or higher, wherein the propylene polymer is a particulate propylene polymer having a specific surface area of 0.1 $m^2/g$ or more.

Preferably, the specific surface area of the particulate propylene polymer is 0.2 $m^2/g$ or more, more preferably 0.3 $m^2/g$ or more; the vinyl monomer is an aromatic vinyl monomer; the vinyl monomer comprises an aromatic vinyl monomer and a vinyl monomer other than the aromatic vinyl monomer, in which the amount of the latter is the same as or less than that of the former; the vinyl monomer is used in an amount of 5% by weight or more based on the total weight of the propylene polymer and the vinyl monomer; the process comprises premixing a propylene polymer with a vinyl monomer and then using a co-rotating twin-screw extruder having a ratio of a screw length (L) to a screw diameter (D) of 30 or more, more preferably from 40 to 70; the residential time in the co-rotating twin-screw extruder is 1 minute or more, more preferably from 3 to 10 minutes; and the modified propylene polymer is a propylene polymer grafted with a polymer derived from the vinyl monomer.

Further, these and other objects of the present invention have been attained by a modified propylene polymer composition obtained by mixing (a) a particulate propylene polymer having a specific surface area of 0.1 $m^2/g$ or more, (b) 5% by weight or more of a vinyl monomer mainly comprising an aromatic vinyl monomer based on the total weight of the vinyl monomer and the propylene polymer, and (c) a radical polymerization initiator, substantially impregnating the vinyl monomer and the radical polymerization initiator into the propylene polymer, and then polymerizing the vinyl monomer by melt-kneading.

Preferably, the polymerization reaction is carried out by using a co-rotating twin-screw extruder having a ratio of a screw length (L) to a screw diameter (D) of 30 or more, and the modified propylene polymer is a propylene polymer grafted with a polymer derived from the vinyl monomer.

Furthermore, these and other objects of the present invention have been attained by a resin composition comprising the above-described modified polypropylene polymer and a resin selected from the group consisting of a polyamide resin, a polyester resin and a polyphenylene ether resin.

DETAILED DESCRIPTION OF THE INVENTION

Figure 1:
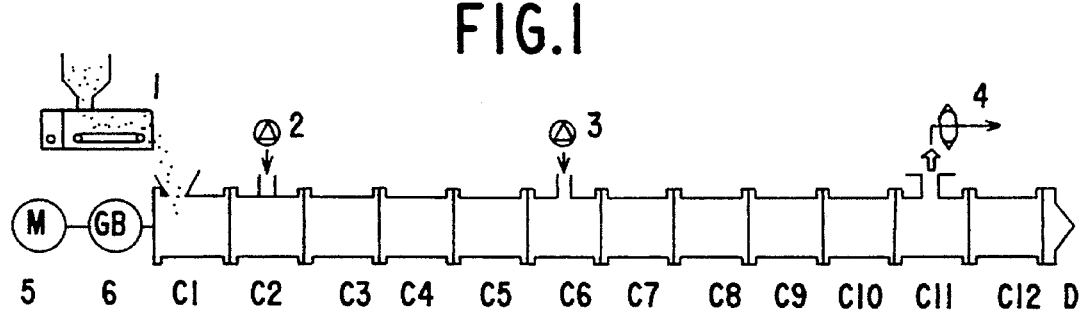
FIG. 1 is a schematic side view of a twin-screw extruder comprising a 12-segmented barrel (L/D=42), with the proviso that the screw is not shown as a schematic side view.

The above-described propylene polymer having a specific surface area of 0.1 $m^2/g$ or more for use in the present invention means a propylene homopolymer and a copolymer comprising propylene as a main unit (preferably 75% by weight or more) and other olefins or ethylenically unsaturated monomers. The propylene polymer may be polymerized with any catalyst system (e.g., a Ziegler-Natta catalyst or a Kaminsky catalyst). Typical examples of the propylene polymers include isotactic polypropylene, crystalline propylene-ethylene copolymers, crystalline propylene-butene copolymers, and maleic anhydride-modified polypropylene. These propylene polymers may be used either individually or as a combination of two or more thereof. If the propylene polymer has too low crystallinity or if the comonomer unit content is high, that is, exceeds 25% by weight (if the propylene unit content is less than 75% by weight), it is not preferred because the propylene polymer is dissolved in a vinyl monomer so that the resulting premix becomes sticky, forming masses, and is hardly fed to an extruder. Accordingly, a preferred propylene polymer is a propylene homopolymer, a propylene copolymer having a propylene content of 75% by weight or more, and a mixture thereof.

The above-mentioned propylene polymer has a fine particulate form preferably having a particle diameter of from 10 μm to 2 mm, still preferably a diameter of from 50 μm to 1,000 μm. With an increase in particle diameter, the particles are porous. Also, the propylene polymer particles preferably have a large specific surface area sufficient for adsorbing a vinyl monomer without being dissolved in a vinyl monomer, i.e., a specific surface area of 0.1 $m^2/g$ or more, preferably 0.2 $m^2/g$ or more, and more preferably 0.3 $m^2/g$ or more. If the specific surface area is less than 0.1 $m^2/g$, it takes much time to impregnate the propylene polymer with the vinyl monomer at ambient temperature, the reactive extrusion processability of the propylene polymer is reduced, the compatibility between the propylene polymer and the polymer of the vinyl monomer tends to be non-uniform, and the modified propylene polymer is inferior in transparency and rigidity. Suitable examples of propylene polymers having a large specific surface area are "Accurel PP" produced by AKZO (the Netherlands), and "Spheripol PP" produced by Himont Inc. (Italy).

Other powdered polymers sparingly soluble in a vinyl monomer may be used in combination in a proportion that does not impair the properties of the particulate propylene polymer. The proportion of a radical-crosslinking powdered polymer, such as polyethylene, if used in combination, is preferably equal to or less than the total polymer because it is crosslinked during melt-kneading to bring on an increase of kneading torque.

The vinyl monomer impregnated into the particulate propylene polymer is liquid at ambient temperature. It mainly comprises an aromatic vinyl monomer and may contain other vinyl monomers. Suitable aromatic vinyl monomers include styrene, methylstyrene, vinyltoluene, vinylxylene, ethylvinylbenzene, isopropylstyrene, chlorostyrene, dichlorostyrene, and bromostyrene, with styrene being preferred. These aromatic vinyl monomers may be used either individually or as a combination thereof. The aromatic vinyl monomer is effective to suppress reduction in molecular weight of a propylene polymer during melt-kneading and polymerization thereby to improve mechanical properties, such as rigidity.

The above-mentioned aromatic vinyl monomer may be used in combination with other copolymerizable vinyl monomers, such as vinyl cyanides, e.g., acrylonitrile; vinyl esters, e.g., vinyl acetate; acrylic acid or methacrylic acid and alkyl esters or glycidyl esters thereof; and maleic acid.

In particular, it is preferred that a vinyl monomer having a functional group capable of forming a hydrogen bond for increasing the polarity of the resulting graft polymer to thereby improve printability and adhesion is used in combination with the aromatic vinyl monomer. Such a polar functional group-containing vinyl monomer includes epoxy group-containing vinyl monomers, hydroxyl group-containing vinyl monomers, carboxyl group-containing vinyl monomers, oxazoline-group containing vinyl monomers or silanol-group containing vinyl monomers, which are each copolymerizable. Epoxy group-containing vinyl monomers or carboxyl-containing vinyl monomers are preferred.

The epoxy group-containing vinyl monomers include glycidyl methacrylate, glycidyl acrylate, allyl glycidyl ether, methacryl glycidyl ether, and mixtures thereof, with glycidyl methacrylate being preferred.

The hydroxyl group-containing vinyl monomers include 2-hydroxyethyl methacrylate, 2-hydroxypropyl methacrylate, 2-hydroxyethyl acrylate, 2-hydroxypropyl acrylate, 2-hydroxybutyl methacrylate, and mixtures thereof.

The silyl group-containing vinyl monomers include vinyltrimethoxysilane, vinyltriethoxysilane, vinyltributoxysilane, 3-methacryloxypropyltrimethoxysilane, 3-methacryloxypropylmethyldimethoxysilane, vinyltris(2-methoxyethoxy)silane, and mixtures thereof.

The carboxyl group-containing vinyl monomers include acrylic acid, methacrylic acid, maleic anhydride, maleic acid, alkyl esters of these acids, and mixtures thereof.

The oxazoline group-containing vinyl monomers include 2-vinyl-2-oxazoline, 2-vinyl-4-methyl-2-oxazoline, 2-isopropenyl-2-oxazoline, and 2-isopropenyl-4-oxazoline.

The vinyl monomer is preferably used in an amount of 5% by weight or more, still preferably from 5 to 50% by weight, based on the sum of the vinyl monomer and the particulate propylene polymer. The ratio of the aromatic vinyl monomer in the total vinyl monomer is 50% by weight or more, preferably 80% by weight or more. When the aromatic vinyl monomer is used in combination with other vinyl monomers, the amount of the former is preferably more than that of the latter, specifically 1 to 5 times as much as the latter in order to prevent reduction of the molecular weight of the modified propylene polymer. The amount of the monomers other than aromatic vinyl monomers is within such a range that the resulting modified propylene polymer would not suffer from reduction in molecular weight, stickiness, moisture absorption or reduction in mechanical properties.

The radical polymerization initiator for use in the present invention is selected from those which are easily soluble in an aromatic vinyl monomer and are decomposed to one-half its initial amount in 1 minute at a temperature of 130° C. or more, preferably at a temperature of from 175° to 250° C.

Typical examples of the above-mentioned radical initiator include tert-butyl peroctate, dicumyl peroxide, tert-butyl perbenzoate, dimethyldi(tert-butyl peroxy)hexane, bis(tert-butyl peroxyisopropyl)benzene, dimethyldi(tert-butyl peroxy)hexyne, diisopropylbenzene hydroperoxide, and cumene hydroperoxide.

The radical polymerization initiator is preferably used in an amount of from 0.1 to 10 parts by weight, more preferably from 1 to 5 parts by weight, per 100 parts by weight of the vinyl monomer.

Because polypropylene is greatly degraded in the presence of a radical as compared with polyethylene, addition of a so-called stabilizer is preferably added when a graft polymerization is carried out. As a matter of course, the kind and the amount of the stabilizer is selected so as not to interfere with polymerization of the vinyl monomer.

Typical examples of the stabilizers include hindered phenol type stabilizers, such as pentaerythrityl tetrakis((di-tert-butyl-hydroxyphenyl)propionate), octadecyl (di-tert-butyl-hydroxyphenyl)propionate, thiobis(methyltert-butylphenol), and trimethyl-tris(di-tert-butylhydroxybenzyl)benzene; phosphorus type stabilizers, such as tetrakis(di-tert-butylphenyl)biphenylene phosphite ad tris(di-tert-butylphenyl) phosphite; metal soaps, such as zinc stearate and calcium stearate; and adsorbing antacids, such as magnesium oxide and hydrotalcite.

The stabilizer is generally used in an amount of from 0.01 to 1 part by weight, preferably of from 0.05 to 0.5 part by weight, per 100 parts by weight of the particulate propylene polymer.

Furthermore, a small amount of a solvent or water may be added for purposes of dilution or degassing of the monomers or the radical initiator.

In the present invention, the vinyl monomer and the radical initiator are substantially impregnated into the particulate propylene polymer. The impregnation is carried out under temperature and time conditions which do not induce polymerization of the vinyl monomer. In using a radical initiator, the temperature and time conditions are decided so as not to cause substantial decomposition of the initiator.

While impregnation of the vinyl monomer and the radical initiator into the propylene polymer makes the modified propylene polymer more uniform and improves physical properties such as transparency, a premix of the particulate propylene polymer impregnated with the vinyl monomer and the initiator has fluidity for smooth feed to a melt-kneading machine, such as an extruder. To this effect, the impregnated particulate propylene polymer preferably has an angle of repose of 70° or less, still preferably from 35° to 60°.

In general, an angle of repose (a spatule angle) is an indication of powder fluidity in particle technology. A spatule is put in a powder sample to a given depth and then pull out to form a mountain of powder, and the angle formed by the slope of the mountain and the horizon is measured (*Powder and Industry*, Vol. 9, No. 1, pp. 61–72 (1977)). The measurement is usually made at room temperature with a powder tester manufactured by Hosokawa Micron Funtai Kogaku Kenkyusho.

With the angle of repose falling within the above range, the impregnated particulate propylene polymer has satisfactory fluidity for feeding to a melt-kneading machine.

The premixing of the propylene polymer and the vinyl monomer is conducted to impregnate the vinyl monomer into the propylene polymer. The mixing temperature is 100° C. or less, preferably from 20° to 80° C. A range of from 20° to 50° C. is still preferred for preventing evaporation of the vinyl monomer. The mixing time is preferably at least 5 minutes, still preferably from 10 to 60 minutes. The premixing is preferably performed in a closed mixer, e.g., a Henschel mixer, or in the feed zone of an extruder where the propylene polymer remains unmelted. The premixing is preferably conducted in the presence of an inert gas atmosphere, such as nitrogen.

Melt-kneading of the vinyl monomer-impregnated particulate propylene polymer and polymerization reaction of the vinyl monomer can be carried out by means of a closed vessel, such as a Banbury mixer, or a melt-kneading machine for continuous production, such as an extruder. An extruder is a preferred melt-kneading machine for industrial production involving, for example, pelletizing.

From the standpoint of bite of the material fed and ease in polymerization time control, a twin-screw extruder is preferable to a single-screw extruder, and a co-rotating twin-screw extruder is more preferable.

However, use of a single-screw extruder is disadvantageous in that the propylene polymer tends to slide on the screw, failing to sufficiently bite into the screw when the propylene polymer is premixed with the vinyl monomer. The dispersive mixing force tends to be insufficient so that the graft polymer component in the modified propylene polymer tends to become large particles, resulting in reduced physical properties such as transparency.

The residential time in an extruder is preferably 1 minute or more. If it is less than 1 minute, the polymerization time is too short even in the case of using a co-rotating twin-screw extruder, still more a counter-rotating twin-screw extruder. As a result, the reaction rate of the vinyl monomer is reduced, or the modified propylene polymer is less uniform and less transparent, or the content of the vinyl monomer-derived component in the modified propylene polymer cannot be increased for sufficient improvement of rigidity.

If the propylene polymer is fed to a co-rotating twin-screw extruder and melted, and the vinyl monomer is fed to the molten polymer through the middle of the extruder by means of a liquid column pump, the resulting modified propylene polymer has poor transparency or tends to suffer from fish eyes due to insufficient compatibility between the propylene polymer and the vinyl monomer-derived component.

A schematic view of the preferable co-rotating twin-screw extruder for use in the present invention is shown in FIG. 1. The twin-screw extruder has a ratio of the screw length (L) to the screw diameter (D) of 30 or more, more preferably 35 or more, and particularly preferably from 40 to 70, and a residential time therein is preferably 1 minute or more, more preferably from 3 to 10 minutes.

As is shown in FIG. 1, the co-rotating twin-screw extruder comprises metering feeder 1, liquid column pumps 2 and 3, vacuum line 4, motor 5, gear box 6, cylinders C1 to C12, and die D. The screw are a segment type. If desired, the screws may be provided with a kneading disc block or a reverse flight block to improve dispersive mixing ability or to increase the residential time.

The co-rotating twin-screw extruder is suitable for production of the modified propylene polymer of the present invention because it has more stable feeding ability and a longer residential time than a single-screw extruder or a counter-rotating twin-screw extruder and also it exhibits satisfactory effects in kneading the polymer in the cylinder and renewing the surface of the molten polymer and is therefore excellent in degassing and self-cleaning effects. Available co-rotating twin-screw extruders have a screw diameter (D) of from 20 to 400 mm, but those having an L/D ratio of less than 30 have an insufficient residential time, tending to reduce the reaction rate of the vinyl monomer, to produce a heterogeneous and less transparent modified propylene polymer, or to make the extrusion rate instable. As a result, they are not preferred because extrusion moldability thereof is poor.

The screw includes double flight screws and triple flight screws. The mode of engagement of two screws includes perfect engagement, imperfect engagement, and non-engagement. Any of these screw designs may be employed according to the aimed grade of the modified propylene polymer.

Vacuum line 4 is used for, for example, removal of the unreacted monomer(s).

It is essential for obtaining a uniform modified propylene polymer having excellent compatibility that the vinyl monomer is premixed with the propylene polymer before the latter is melted. This can be done by feeding the premix to an extruder from the feed throat farthest from the extrusion die by means of a metering feeder, or alternatively, feeding only the propylene polymer from a metering feeder and supplying the vinyl monomer through the second or third feed throat at which the propylene polymer still remains unmelted.

The extruder for use in the present invention is usually equipped with a metering feeder for constant delivery of the starting material, a liquid column pump for separate addition of a vinyl monomer or, if used, an azeotropic agent, an inert gas feeder for conducting kneading polymerization in an inert gas atmosphere, a vent port and a vacuum pump for removal of residual monomers or decomposition by-products after polymerization, and a water tank and a cutter or a pelletizer composed of these elements integrated for pelletizing the modified propylene polymer. The extruder may also be fitted with apparatus for viscosity measurement, composition analysis, and the like for quality control.

The melt-kneading temperature in the extruder is preferably carried out at a temperature of from 170° to 230° C.

The modified propylene polymer is preferably produced by feeding a particulate propylene polymer previously impregnated with a vinyl monomer and the like to an extruder, heating the material at a temperature of from 150° to 250° C. while applying pressure to melt the propylene polymer and to polymerize the vinyl monomer, and extruding the molten polymer from the die.

In this case, the vinyl monomer is previously blended and sufficiently impregnated with the propylene polymer, and then applied to the extruder. If the proportion of the vinyl monomer is considerably high, a part of it may be fed through a feeder for liquid to the propylene polymer in a molten state.

When a radical polymerization initiator is used in combination, it is preferably added after previously dissolved in the vinyl monomer. It may also be fed to the vinyl monomer-impregnated propylene polymer in a molten state by means of a pump for liquid. When a stabilizer is used in combination, it is preferably premixed with the particulate propylene polymer beforehand.

According to the present invention, in the case where the vinyl monomer is polymerized in the presence of a radical initiator, since it is polymerized while being brought into sufficient contact with the molten propylene polymer and sufficiently mixed therewith, it is possible that the polymer derived from the vinyl monomer be grafted to the propylene polymer to provide a graft polymer. Unlike an ethylene polymer, a usual propylene polymer is degradable in the presence of a radical so that it is liable to be molecularly reduced when merely heated and melted. However, when the propylene polymer is heat-melted in the presence of a vinyl monomer comprising an aromatic vinyl monomer, it is ready to undergo a graft reaction, while prevented from forming a network structure.

The resulting modified propylene polymer comprises a propylene polymer component and a vinyl polymer component mainly comprising an aromatic vinyl polymer component. However, it is homogeneous and can be obtained either as molding materials or pellets.

The modified propylene polymer according to the present invention is a thermoplastic resin by itself having excellent properties particularly such as heat resistance, rigidity, moisture resistance, and surface properties. Accordingly, it is useful as a molding material for food packages, containers, and various housings. Further, because the modified propylene polymer comprises a polar component and a non-polar component, it also serves as an excellent compatibilizer among various kinds of polymers or between polymers (resins) and inorganic fillers.

If desired, the modified propylene polymer of the present invention may contain reinforcing fibers, such as glass fiber, carbon fiber, quebra fiber; inorganic fillers, such as calcium carbonate, silica, mica, and aluminum hydroxide; organic or inorganic pigments or dyes; and ultraviolet absorbers. These additives can be previously mixed with the particulate propylene polymer or be added when the vinyl monomer-impregnated propylene polymer is melt-kneaded as far as the effects of the present invention are not impaired.

Ultraviolet absorbers include those having an unsaturated group in the molecule thereof, preferably those having at least one functional group in the molecule thereof and selected from benzotriazole groups, benzophenone groups, benzoic ester groups, cyanoacrylate groups, and salicylate groups. Benzotriazole compounds are particularly preferred. Examples of the benzotriazole compounds are represented by formula (I):

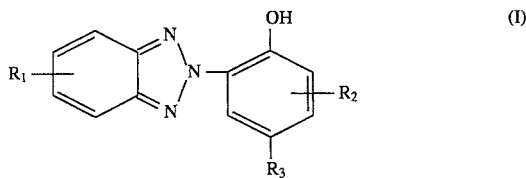

(I)

wherein one of $R_1$, $R_2$, and $R_3$ represents a group represented by the following formula (II); and the rest two of $R_1$, $R_2$, and $R_3$ each represents a hydrogen atom, an alkyl group having from 1 to 8 carbon atoms, a halogen atom or an alkoxy group having from 1 to 8 carbon atoms; the position of $R_2$ and $R_3$ may be any of ortho-, meta- and para-positions; and the position of $R_1$ is not restricted:

$$-R'-O-CO-C(R'')=CH_2 \quad (II)$$

wherein R' represents a straight-chain or branched alkyl or alkoxy group; and R" represents a hydrogen atom, an alkyl group, a haloalkyl group, and an alkoxy group.

The ultraviolet absorber is preferably used in an amount of from 0.05 to 10% by weight, still preferably from 0.1 to 10% by weight, based on the propylene polymer. If it exceeds 10% by weight, it is not preferred because the reaction rate and mechanical properties are adversely affected. If it is less than 0.05% by weight, it is not preferred because no substantial effect of improving weather resistance is produced.

The modified propylene polymer can be blended with other resins to provide polymer alloys. For example, it may be blended with polyamide resins, polyester resins, polyphenylene ether resins, polycarbonate resins, polyarylene sulfide resins, polyurethane resins, polysulfone resins, polystyrene, polyvinyl chloride, and polyolefins (e.g., polyethylene, polypropylene).

The polyamide resins for use in the present invention include high polymers containing acid amido (—CONH—) as a repeating unit and having a melt viscosity of 2,000 poise or more, classified by the mode of polymerization into those obtained by ring opening polymerization of lactams, those obtained by polycondensation of diamines and dibasic acids, and those obtained by polycondensation of aminocarboxylic acids. These polyamide resins are designated by general name "nylon" like nylon 6, nylon 12, nylon 9, nylon 11, nylon 66, and nylon 610. Of these, nylon 6 and nylon 66 are preferred.

The polyester resins for use in the present invention preferably include aromatic polyester resins containing an aromatic ring as a repeating unit and having a melt viscosity of 2,000 poise or more, which are polymers or copolymers obtained by a condensation reaction of aromatic dicarboxylic acids or ester derivatives thereof and diols or ester derivatives thereof as main components.

The aromatic dicarboxylic acids include terephthalic acid, isophthalic acid, phthalic acid, 2,6-naphthalenedicarboxylic acid, 1,5-naphthalenedicarboxylic acid, bis(p-carboxyphenyl)methane, anthracenedicarboxylic acid, 4,4'-diphenyldicarboxylic acid, 4,4'-diphenyl ether dicarboxylic acid, 1,2-bis(p-carboxyphenoxy)ethane, and ester derivatives thereof. Up to 30 mol % of the aromatic dicarboxylic acid component may be displaced with dicarboxylic acids other than the aromatic dicarboxylic acids, for example, aliphatic dicarboxylic acids, such as adipic acid, sebacic acid, azelaic acid, and dodecanedioic acid, and alicyclic dicarboxylic acid, such as 1,3-cyclohexanedicarboxylic acid and 1,4-cyclohexanedicarboxylic acid.

The diol component includes aliphatic diols having from 2 to 10 carbon atoms, e.g., ethylene glycol, propylene glycol, 1,4-butanediol, 3-methyl-1,3-propanediol, neopentyl glycol, 1,5-pentanediol, 1,6-hexanediol, decamethylene glycol, cyclohexanediol, and cyclohexanedimethanol. Long-chain glycol component having a molecular weight of from 400 to 6,000 such as polyethylene glycol, poly-1,3-propylene glycol and polytertamethylene glycol may be copolymerized therewith as far as the proportion is low.

Suitable aromatic polyester resins for use in the present invention include polybutylene terephthalate, polyethylene terephthalate, polyhexamethylene terephthalate, polycyclohexynedimethylene terephthalate, polyethylene-2,6-naphthalate, and polybutylene-2,6-naphthalate, with polybutylene terephthalate being preferred.

The melt viscosity of the polyamide resins and aromatic polyester resins for use in the present invention means an apparent melt viscosity measured with Capillograph 1B, manufactured by Toyo Seiki K.K., at a resin temperature of 250° C. and a shear rate of 100 sec$^{-1}$. In the present invention, the melt viscosity of the polyamide resin or the aromatic polyester resin is 2,000 poise or more. If the melt viscosity is lower than 2,000 poise, the melt viscosity of the thermoplastic resin composition obtained by melt-kneading the modified propylene polymer is low, that is, a parison is drew down in blow molding or the upper and lower parts of the obtained molded materials have different thickness.

The polyphenylene ether resins with which the modified propylene resin of the present invention can be blended are represented by formula (III):

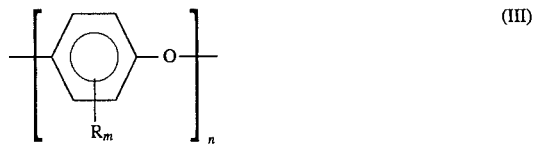

(III)

wherein plural substituents R each independently represents a hydrogen atom, a halogen atom, a hydrocarbon group, a halogen-substituted hydrocarbon group, a hydrocarbon-oxy group, or a halohydrocarbon-oxy group; m represents a degree of substitution of 4 or less; and n represents a degree of polymerization usually of at least 50.

The polyphenylene ether resins and processes for production thereof are unrelated to the present invention. The resins can be prepared by referring to literature, e.g., U.S. Pat. Nos. 3,306,874 and 3,306,875.

Examples of the polyphenylene ether resins for use in the present invention include poly(2,6-dimethylphenylene) ether, poly(2-methyl-6-ethyl-1,4-phenylene) ether, poly(2,6-dipropyl-1,4-phenylene) ether, poly(2-ethyl-6-propyl-1,4-phenylene) ether, poly(2,6-dilauryl-1,4-phenylene) ether, poly(2,6-diphenyl-1,4-phenylene) ether, poly(2,6-diemthoxy-1,4-phenylene)ether, poly(2,3,6-trimethyl-1,4-phenylene) ether, poly(2,3,5,6-tetrapropyl-1,4-phenylene) ether, poly(2,6-diethoxy-1,4-phenylene) ether, poly(2-methoxy-6-ethoxy-1,4-phenylene) ether, poly(2-ethyl-5-stearyloxy-1,4-phenylene) ether, poly(2,6-dichloro-1,4-phenylene) ether, poly(2,3-dimethyl-5-chloro-1,4-phenylene) ether, poly(2-methyl-6-phenyl-1,4-phenylene)ether, poly(2,6-dibenzyl-1,4-phenylene) ether, poly(3-chloro-1,4-phenylene) ether, poly(3,5-dimethyl-1,4-phenylene) ether, poly(3-ethoxy-1,4-phenylene) ether, poly(2-chloro-1,4-phenylene) ether, and poly(2,5-dibromo-1,4-phenylene) ether.

The present invention will now be illustrated in greater detail with reference to the following Examples and Comparative Examples, but it should be understood that the present invention is not to be deemed to be limited thereto. Unless otherwise indicated, all parts and percents are by weight.

EXAMPLE 1

In a 10 l Henschel mixer were charged and dry-blended 800 parts of particulate polypropylene Accurel PP, produced by AKZO, 0.4 part of a stabilizer Irganox 1010, produced by Ciba-Geigy Ltd., 0.4 part of a stabilizer Irgafos 168, produced by Ciba-Geigy Ltd., and 0.8 part of calcium stearate. A mixture of 200 parts of styrene and 2 parts of a polymerization initiator Perhexyne 25B, produced by Nippon Oil & Fats Co., Ltd., was added to the above blend and premixed at 40° C. and 1,500 rpm. The premix was sampled at given time intervals (every 3, 5 or 10 minutes), and the angle of repose was measured with a powder tester. Three measured values per sample were plotted against the mixing time, and from the graph was obtained the mixing time required for reducing the angle of repose to 60°, which time was taken as a necessary impregnation time. The premix whose angle of repose was 60° could be fed to an extruder continuously and smoothly.

Figure 2:
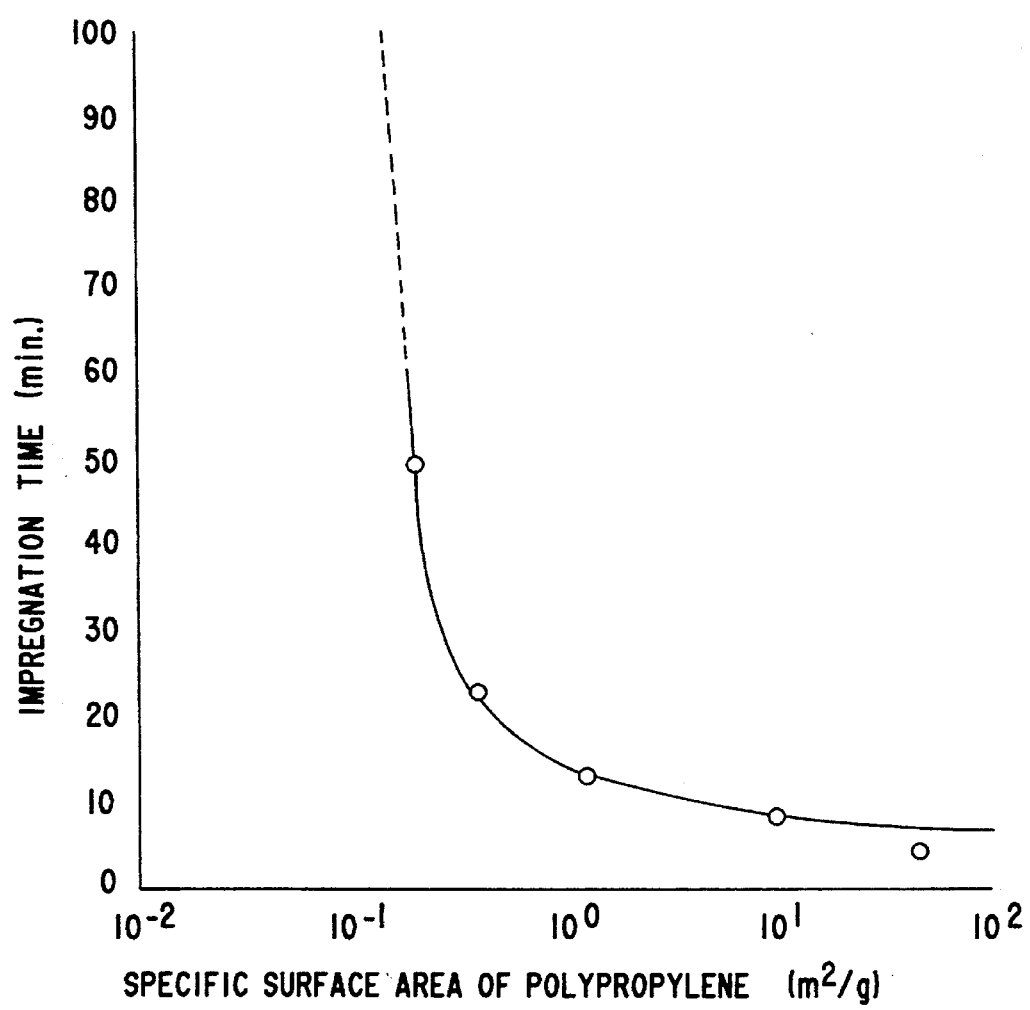
FIG. 2 is a graph of the relationship of impregnation time and specific surface area of polypropylene.

In the same manner as described above except for replacing Accurel PP with the same amount of particulate polypropylene Probicgranule PN230, produced by Tokuyama Corp., having a specific surface area of 0.2 m²/g, or a mixture of Accurel PP and Probicgranule PN230 at a varied mixing ratio as shown in Table 1 below, a premix was prepared, and the necessary impregnation time (time required for reducing the angle of repose to 60°) was obtained. The results obtained are shown in Table 1. The relationship between specific surface area of polypropylene and necessary impregnation time is shown in FIG. 2.

TABLE 1

|  | 1 | 2 | 3 | 4 | 5 |
|---|---|---|---|---|---|
| Composition (%): | | | | | |
| Accurel PP | 0 | 5 | 10 | 30 | 100 |
| PN230 | 100 | 95 | 90 | 70 | 0 |
| Average | 0.2 | 0.4 | 1.1 | 9.8 | 31 |

TABLE 1-continued

|  | 1 | 2 | 3 | 4 | 5 |
|---|---|---|---|---|---|
| Specific Surface Area (m²/g) | | | | | |
| Mixing Time (min) | 30 40 50 | 20 30 40 | 10 20 30 | 5 10 15 | 5 10 15 |
| Angle of Repose (°) | 65 61 59 | 63 59 57 | 65 57 54 | 66 59 55 | 58 53 50 |
| Necessary Impregnation Time (min) | 48 | 24 | 13 | 8 | 4 |

EXAMPLE 2

In a 10 l Henschel mixer were charged and dry blended 800 parts of Accurel PP (specific surface area: 31 m²/g), 0.4 part of Irganox 1010, 0.4 part of Irgafos 168, and 0.8 part of calcium stearate. A mixture of 200 parts of styrene and 2 parts of Perhexyne 25B was added to the blend and premixed at 40° C. for 30 minutes.

The resulting premix had an angle of repose of 48° as measured with a powder tester and could be fed to an extruder continuously and smoothly.

The premix was fed to a twin-screw extruder (diameter: 30 mm), produced by Brabendar, Germany, equipped with a metering feeder and set at a barrel temperature of 200° C. (feeder zone: 180° C.) and a die temperature of 210° C. and melt-kneaded at a screw speed of 20 rpm to conduct polymerization of styrene, and the resulting modified propylene polymer was extruded as pellets.

The pellets were injection molded in an injection molding machine Model IS50AM, manufactured by Toshiba Machine Co., Ltd. at a resin temperature of 230° C. to prepare test specimens, and various physical properties and molding properties were measured using the test specimens according to the following test methods.

Further, the pellets were analyzed by infrared spectroscopy. A styrene content of the sample was obtained from a calibration curve based on the ratio of the IR absorption intensity at 700 cm$^{-1}$ assigned to styrene to that at 1380 cm$^{-1}$ assigned to polypropylene, and the rate of polymerization of styrene was calculated from the styrene content. In order to see whether or not the polystyrene had been grafted to the polypropylene, the pellets were put in tetrahydrofuran as a solvent capable of dissolving polystyrene but incapable of dissolving polypropylene to extract polystyrene in a Soxhlet extractor under reflux. The graft ratio was obtained from the retention of polystyrene in the pellets.

All these measurement results are shown in Table 2. As can be seen from Table 2, the rate of polymerization was 90% or more, at which recovery of the unreacted monomer is not particularly requested; the goal of rigidity, i.e., a 10% or more increase over the rigidity of unmodified polypropylene, was attained; the light transmission was 65% or more, which is acceptable as a packaging material; and the heat distortion temperature was 130° C. or more, which is demanded for use as a packaging vessel for microwave oven. The moisture permeability of the modified polypropylene was practically equal to that of unmodified polypropylene and, as a matter of course, much more satisfactory than that of polystyrene.

COMPARATIVE EXAMPLE 1

A mixture of 200 parts of styrene and 2 parts of Perhexyne 25B was mixed with a propylene polymer in a Henschel mixer in the same manner as in Example 2, except for replacing 800 parts of particulate polypropylene Accurel PP with the same amount of pelletized polypropylene Tokuyama POLYPRO MS230, produced by Tokuyama Corp. The mixing was conducted at 50° C. for 30 minutes, but the pelletized polypropylene did not absorb styrene, and meanwhile styrene separated and began to run out, so that mixing was abandoned.

COMPARATIVE EXAMPLE 2

The same pelletized polypropylene as used in Comparative Example 1 (Tokuyama POLYPRO MS230) was fed to a twin-screw extruder (Brabendar; diameter: 30 mm) set at the same temperature conditions as in Example 2 at a rate of 800 parts per hour by means of a metering feeder and melt-kneaded at a screw speed of 20 rpm. From the middle of the extruder, styrene containing 1% Perhexyne 25B was added at a rate of 200 parts per hour by means of a pump. The mixed resin was melt-kneaded to polymerize styrene in the same manner as in Example 2 to obtain modified propylene polymer pellets. The pellets were injection molded to prepare test specimens in the same manner as in Example 2. The modified propylene polymer pellets were analyzed, and the test specimens were tested in the same manner as in Example 2. The results obtained are shown in Table 2.

As is apparent from Table 2, the polymerization rate of styrene was less than 90%, and the graft ratio was less than 20%. The transparency necessary for use as a packaging material was less than 65%. Probably because of this inferiority, the improvement in rigidity was as slight as less than 10% increase over unmodified polypropylene.

EXAMPLE 3

A particulate premix was prepared in the same manner as in Example 2, except for using Probicgranule PN230 (specific surface area: 0.2 m$^2$/g) in place of Accurel PP (specific surface area: 31 m$^2$/g).

The premix had an angle of repose of 65° as measured with a powder tester. The premix could be fed to an extruder continuously.

The premix was fed to a twin-screw extruder (Brabendar; diameter: 30 mm) equipped with a metering feeder and set at a barrel temperature of 200° C. (feeder zone: 180° C.) and a die temperature of 210° C. and melt-kneaded at a screw speed of 20 rpm to conduct polymerization of styrene, and the resulting modified propylene polymer was extruded and pelletized. The pellets were injection molded in Model IS50AM at a resin temperature of 230° C. to prepare test specimens.

The modified propylene polymer pellets were analyzed, and the test specimens were tested in the same manner as in Example 2. The results obtained are shown in Table 2.

It is seen that the rate of polymerization was 90% or more, the improvement in rigidity was as much as 10% or more increase over the unmodified polypropylene; the light transmission was 65% or more, which is acceptable as a packaging material; and the heat distortion temperature was 130° C. or more, which is demanded for use as a packaging vessel for microwave oven.

EXAMPLE 4

A particulate premix was prepared in the same manner as in Example 2, except for replacing Accurel PP (specific surface area: 31 m$^2$/g) with the same amount of a 1:9 mixture of Accurel PP and Probicgranule PN230 and having an average specific surface area of 0.4 m$^2$/g.

The premix had an angle of repose of 58° as measured with a powder tester and could be fed to an extruder continuously and smoothly.

The premix was fed to a twin-screw extruder (Brabendar; diameter: 30 mm) equipped with a metering feeder and set at a barrel temperature of 200° C. (feeder zone: 180° C.) and a die temperature of 210° C. and melt-kneaded at a screw speed of 20 rpm to conduct polymerization of styrene, and the resulting modified propylene polymer was extruded and pelletized. The pellets were injection molded in Model IS50AM at a resin temperature of 230° C. to prepare test specimens.

The modified propylene polymer pellets were analyzed, and the test specimens were tested in the same manner as in Example 2. The results obtained are shown in Table 2.

It is seen that the rate of polymerization was 90% or more, the improvement in rigidity was as much as 10% or more increase over the unmodified polypropylene; the light transmission was 65% or more, which is acceptable as a packaging material; and the heat distortion temperature was 130° C. or more, which is demanded for use as a packaging vessel for microwave oven.

EXAMPLE 5

A particulate premix was prepared in the same manner as in Example 2, except that the amount of Accurel PP (specific surface area: 31 m$^2$/g) was changed from 800 parts to 600 parts, and accordingly, the amounts of Irganox 1010, Irgafos 168, and calcium stearate were also reduced to 0.3 part, 0.3 part, and 0.6 part, respectively, and the resulting blend was premixed with a mixture of 400 parts of styrene and 3 parts of Perhexyne 25B at 50° C. for 30 minutes.

The resulting premix had an angle of repose of 57° as measured with a powder tester and could be fed to an extruder continuously and smoothly.

The premix was fed to a twin-screw extruder (Brabendar; diameter: 30 mm) equipped with a metering feeder and set at a barrel temperature of 200° C. (feeder zone: 180° C.) and a die temperature of 210° C. and melt-kneaded at a screw speed of 20 rpm to conduct polymerization of styrene, and the resulting modified propylene polymer was extruded and pelletized. The pellets were injection molded in Model IS50AM at a resin temperature of 230° C. to prepare test specimens.

The modified propylene polymer pellets were analyzed, and the test specimens were tested in the same manner as in Example 2. The results obtained are shown in Table 2.

It is seen that the rate of polymerization was 90% or more, the improvement in rigidity was as much as 10% or more increase over the unmodified polypropylene; the light transmission was 65% or more, which is acceptable as a packaging material; and the heat distortion temperature was 130° C. or more, which is demanded for use as a packaging vessel for microwave oven.

TABLE 2

|  | Example No | | | | Comparative Example No. | |
| --- | --- | --- | --- | --- | --- | --- |
|  | 2 | 3 | 4 | 5 | 1 | 2 |
| Specific Surface Area of PP* (m²/g) | 31 | 0.2 | 0.4 | 31 | <0.01 | <0.01 |
| Styrene/Styrene + PP (wt %) | 20 | 20 | 20 | 40 | 20 | 20 |
| Impregnation: | | | | | | |
| Temperature (°C.) | 40 | 40 | 40 | 40 | 40 | 40 |
| Time (min) | 30 | 30 | 30 | 30 | 20 | 20 |
| Angle of Repose of Premix (°) | 48 | 65 | 58 | 57 | un-measurable | not measured |
| Polymerization Rate of Styrene (%) | 93 | 92 | 93 | 90 | ** | 84 |
| Graft Ratio of Styrene (%) | 46 | 43 | 45 | 39 | ** | 19 |
| Transparency: | | | | | | |
| Light Transmission (%) | 80 | 75 | 77 | 65 | ** | 62 |
| Haze (%) | 31 | 32 | 30 | 39 | ** | 34 |
| Heat Distortion Temperature (°C.) | 143 | 143 | 143 | 138 | ** | 143 |
| Rigidity (×10⁴ kg/cm²) | 1.77 | 1.75 | 1.75 | 2.15 | ** | 1.57 |
| Reactive Extrusion Processability | excellent | good | excellent | excellent | poor | poor |

Note:
*PP stands for polypropylene.
**Extrusion was impossible.

1) Specific Surface Area

The specific surface area of unmodified propylene polymers was measured with a surface area measuring apparatus Monosorb, manufactured by Yuasa-Ionics.

2) Angle of Repose

The angle of repose of the premix prepared was measured with a powder tester, manufactured by Hosokawa Micron Funtai Kogaku Kenkyusho, in accordance with the instruction manual.

3) Heat Distortion Temperature

Measured in accordance with JIS K-7202 under a load of 1 kg and expressed in terms of Vicat point (° C.).

4) Rigidity

Measured in accordance with JIS K-7203.

5) Transparency

Transparency of a 300 μm thick sheet prepared by hot pressing was measured with a Hazemeter and represented as %.

6) Reactive Extrusion Processability

Evaluated from the angle of repose of the impregnated propylene polymer and rated as follows.

Excellent . . . <60°
Good . . . 60° to 70°
Poor . . . >70°

EXAMPLE 6

In a 75 l Henschel mixer were charged 10,000 parts of particulate polypropylene Idemitsu POLYPRO E-100G, produced by Idemitsu Petrochemical Co., Ltd., having a specific surface area of 0.24 m²/g, 5 parts of Irganox 1010, 10 parts of Irgafos 168, and 5 parts of calcium stearate and mixed at room temperature for 2 minutes. The resulting mixture was designated stabilizer-containing PP-1. A mixture of 1,000 parts of styrene and 10 parts of Perhexyne 25B was premixed with 9,000 parts of stabilizer-containing PP-1 in the same Henschel mixer at 40° C. for 30 minutes.

A co-rotating twin-screw extruder Model TEX44XCT, manufactured by The Japan Steel Works, Ltd., having a screw diameter of 44 mm, composed of a 12-segmented barrel having an L/D ratio of 42 (a feeder through may be provided on each segment), and equipped with a metering feeder was set at a barrel temperature of 180° C. (feeder zone: 160° C.) and a die temperature of 200° C., and the above-prepared premix was fed thereto at a rate of 20,000 parts per hour and melt-kneaded at a screw speed of 150 rpm to conduct polymerization of styrene. The resulting modified propylene polymer was obtained as pellets. The extruded strands were smooth on their surface, transparent, and free from pulsation. The residential time in the extruder was 3 minutes and 15 seconds. The resulting pellets were injection molded in Model IS50AM at a resin temperature of 230° C. to prepare test specimens. The pellets were analyzed in the same manner as in Example 2 to obtain the polymerization rate and graft ratio of styrene. The results obtained are shown in Table 3.

Further, the pellets were analyzed by infrared spectroscopy. A styrene content of the sample was obtained from a calibration curve based on the ratio of the IR absorption intensity at 700 cm$^{-1}$ assigned to styrene to that at 1380 cm$^{-1}$ assigned to polypropylene, and the rate of polymerization of styrene was calculated from the styrene content. In order to see whether or not the polystyrene had been grafted to the polypropylene, the pellets were put in tetrahydrofuran as a solvent capable of dissolving polystyrene but incapable of dissolving polypropylene to extract polystyrene in a Soxhlet extractor under reflux. The graft ratio was obtained from the retention of polystyrene in the pellets.

As can be seen from Table 3, the rate of polymerization was 90% or more, at which recovery of the unreacted monomer is not particularly requested; the improvement in rigidity was as high as 10% or more increase over the unmodified polypropylene; the light transmission was 65% or more, which is acceptable as a packaging material; and the heat distortion temperature was 130° C. or more, which is demanded for use as a packaging vessel for microwave oven. The moisture permeability of the modified polypropylene was practically equal to that of unmodified polypropylene and, as a matter of course, much more satisfactory than that of polystyrene.

COMPARATIVE EXAMPLE 3

Pellets of modified propylene polymer were produced in the same manner as in Example 6, except that the L/D ratio of the co-rotating twin-screw extruder Model TEX44XCT (screw diameter: 44 mm) was changed to 21. The residential time in the extruder was 45 seconds. The resulting pellets were injection molded at a resin temperature of 230° C. in the same manner as in Example 6 to prepare test specimens.

The modified propylene polymer pellets were analyzed, and the test specimens were tested in the same manner as in Example 6. The results obtained are shown in Table 3.

As can be seen from Table 3, the rate of polymerization was less than 80%, and the improvement in rigidity was as slight as a 10% or less increase over unmodified polypropylene. A blown film of the modified polypropylene suffered from more fish eyes than those of Examples 6 to 10.

COMPARATIVE EXAMPLE 4

Melt-kneading and polymerization of the premix of Example 6 was carried out in the same manner as in Example 6, except for using a single-screw extruder having a screw diameter of 30 mm and an L/D ratio of 28, manufactured by Tanabe Tekkosho, in place of the co-rotating twin-screw extruder Model TEX44XCT (screw diameter: 44 mm; L/D ratio: 42). However, the premix slid in the feed zone presumably because it contained liquid, and the screw failed to bite the premix, so that the operation was abandoned.

COMPARATIVE EXAMPLE 5

Stability-containing PP-1 prepared in Example 6 (9,000 parts) was fed to Model TEX44XCT (screw diameter: 44 mm; L/D ratio: 42) equipped with a metering feeder and set at the same temperature conditions as in Example 6 at a rate of 18,000 parts per hour by means of the metering feeder and melt-kneaded at a screw speed of 150 rpm. Styrene containing 1% Perhexyne 25B was fed to the propylene polymer in a molten state through the 6th feed throat from the farthest end from the outlet of the extruder at a rate of 2,000 parts per hour by means of a pump, melt-kneaded, and polymerized in the same manner as in Example 6 to obtain modified propylene polymer pellets. The extruded strands were not smooth on their surface, whitish, and semitransparent. The pellets were injection molded in the same manner as in Example 6 to prepare test specimens. Physical properties were measured using the test specimens in the same manner as in Example 6.

The modified propylene polymer pellets were analyzed in the same manner as in Example 2. The results obtained are shown in Table 3.

As can be seen from Table 3, the rate of polymerization was less than 90%. The resultant pellet gave monomeric odor. Probably because of this inferiority, a blown film obtained from the pellets suffered from more fish eyes as compared with those of Examples 6 to 10. The improvement in rigidity was as slight as a 10% or less increase over unmodified polypropylene.

COMPARATIVE EXAMPLE 6

A mixture of 1,000 parts of styrene and 30 parts of Perhexyne 25B was mixed with a propylene polymer in a Henschel mixer in the same manner as in Example 6, except for replacing 9,000 parts of stabilizer-containing PP-1 with the same amount of pelletized polypropylene Tokuyama POLYPRO MS230 (specific surface area: less than 0.01 $m^2/g$). The mixing was conducted at 40° C. for 30 minutes, but the pelletized polypropylene did not absorb styrene, and meanwhile styrene separated and began to run out, so that mixing was abandoned.

EXAMPLE 7

A premix prepared in the same manner as in Example 6, except for using 8,000 parts of stabilizer-containing PP-1, 2,000 parts of styrene, and 30 parts of Perhexyne 25B was melt-kneaded to conduct polymerization of styrene in the same manner as in Example 6 to obtain modified propylene polymer pellets. The pellets were injection molded in the same manner as in Example 6 to prepare test specimens. Physical properties were measured using the test specimens in the same manner as in Example 6. The modified propylene polymer was analyzed in the same manner as in Example 2 to obtain the polymerization ratio and graft ratio of styrene. The results obtained are shown in Table 3.

The polymerization rate was 90% or more. The test piece showed rigidity greatly improved over the unmodified polypropylene by 10% or more and had a transmission of 65% or more which is acceptable for use as a packaging material. In addition, the heat distortion temperature was 130° C. or more, which is demanded for use as a packaging vessel for microwave oven.

EXAMPLE 8

Stability-containing PP-1 prepared in Example 6 (9,000 parts) was fed to Model TEX44XCT (screw diameter: 44 mm; L/D ratio: 42) equipped with a metering feeder and set at the same temperature conditions as in Example 6 at a rate of 18,000 parts per hour by means of the metering feeder and melt-kneaded at a screw speed of 150 rpm. Styrene containing 3% Perhexyne 25B was fed to the extruder through the 2nd feed throat from the farthest end from the outlet of the extruder at a rate of 2,000 parts per hour by means of a pump, melt-kneaded with the stability-containing PP-1 and polymerized in the same manner as in Example 6 to obtain modified propylene polymer pellets. The pellets were injection molded in the same manner as in Example 6 to prepare test specimens. Physical properties of the test specimens were measured in the same manner as in Example 6, and the modified propylene polymer pellets were analyzed in the same manner as in Example 2. The results obtained are shown in Table 3.

As can be seen from Table 3, the rate of polymerization was 90% or more, and the test piece showed rigidity greatly improved over the unmodified polypropylene by 10% or more and had a light transmission of 65% or more, which is acceptable for use as a packaging material. In addition, the heat distortion temperature was 130° C. or more, which is demanded for use as a packaging vessel for microwave oven.

EXAMPLE 9

A premix prepared in the same manner as in Example 6, except for using 9,000 parts of stabilizer-containing PP-1, 700 parts of styrene, and 300 parts of glycidyl methacrylate was melt-kneaded to conduct polymerization of styrene in the same manner as in Example 6 to obtain modified propylene polymer pellets. The pellets were injection molded in the same manner as in Example 6 to prepare test specimens. Physical properties of the test specimens were measured in the same manner as in Example 6, and the modified propylene polymer pellets were analyzed in the same manner as in Example 2. The results obtained are shown in Table 3.

The polymerization rate was 90% or more. The test piece showed rigidity greatly improved over the unmodified polypropylene by 10% or more and had a light transmission of 65% or more, which is acceptable for use as a packaging material. In addition, the heat distortion temperature was 130° C. or more, which is demanded for use as a packaging vessel for microwave oven.

EXAMPLE 10

In a 75 l Henschel mixer were charged 10,000 parts of particulate block polypropylene Hipol J340P, produced by Mitsui Petrochemical Inc., having a specific surface area of 0.20 m$^2$/g, 5 parts of Irganox 1010, 10 parts of Irgafos 168, and 5 parts of calcium stearate and mixed at room temperature for 2 minutes. The resulting mixture was designated stabilizer-containing PP-2.

A premix prepared in the same manner as in Example 6, except for using 9,400 parts of stabilizer-containing PP-2, 500 parts of styrene, 100 parts of maleic anhydride, and 18 parts of Perhexyne 25B was melt-kneaded to conduct polymerization of styrene in the same manner as in Example 6 to obtain modified propylene polymer pellets. The pellets were injection molded in the same manner as in Example 6 to prepare test specimens.

Physical properties of the test specimens were measured in the same manner as in Example 6, and the modified propylene polymer pellets were analyzed in the same manner as in Example 2. The results obtained are shown in Table 3.

The polymerization rate was 90% or more. The test piece showed an improvement in rigidity over the unmodified polypropylene by 10% or more and had a light transmission of 65% or more, which is acceptable for use as a packaging material. In addition, the heat distortion temperature was 130° C. or more, which is demanded for use as a packaging vessel for microwave oven.

COMPARATIVE EXAMPLE 7

A premix prepared in the same manner as in Example 9, except that 700 parts of styrene was not used and 18 parts of Perhexyne 25B was further added, was melt-kneaded to conduct polymerization of styrene in the same manner as in Example 6 to obtain modified propylene polymer pellets. The pellets were injection molded in the same manner as in Example 6 to prepare test specimens.

Physical properties of the test specimens were measured in the same manner as in Example 6, and the modified propylene polymer pellets were analyzed in the same manner as in Example 2. The results obtained are shown in Table 3.

The polymerization rate was less than 90%. The extruded strands had a low melt viscosity and suffered from fusion with each other and were hardly pelletized. The rigidity was rather reduced as compared with the unmodified polypropylene by 10% or more. While the light transmission was 65% or more, which is acceptable for use as a packaging material, the heat distortion temperature was lower than 130° C., which is demanded for use as a packaging vessel for microwave oven.

TABLE 3

| | Example 6 | Compara. Example 3 | Compara. Example 4 | Compara. Example 5 | Compara. Example 6 | Example 7 | Example 8 | Example 9 | Example 10 | Compara. Example 7 |
|---|---|---|---|---|---|---|---|---|---|---|
| Extruder Screw | twin | twin | single | twin | twin | twin | twin | twin | twin | twin |
| Extruder L/D Ratio | 42 | 21 | 28 | 42 | 42 | 42 | 42 | 42 | 42 | 42 |
| Specific Surface Area of PP* (m$^2$/g) | 0.24 | 0.24 | 0.24 | 0.24 | <0.01 | 0.24 | 0.24 | 0.24 | 0.20 | 0.24 |
| Styrene/ Styrene + PP (wt %) | 10 | 10 | 10 | 10 | 10 | 20 | 10 | 7 | 5 | 0 |
| Polymerization Rate of Styrene (%) | 94 | 79 | ** | 82 | *** | 92 | 91 | 92 | 91 | — |
| Graft Ratio of Styrene (%) | 46 | 43 | ** | 19 | *** | 51 | 43 | 49 | 52 | — |
| Transparency: | | | | | | | | | | |
| Light Transmission (%) | 80 | 75 | ** | 59 | *** | 75 | 73 | 83 | 71 | 85 |
| Haze (%) | 31 | 32 | ** | 39 | *** | 31 | 34 | 35 | 37 | 30 |
| Heat Distortion Temperature (°C.) | 143 | 143 | ** | 138 | *** | 141 | 143 | 142 | 139 | 116 |
| Rigidity (×10$^4$ kg/cm$^2$) | 1.77 | 1.32 | ** | 1.37 | *** | 2.02 | 1.73 | 1.75 | 1.51 | 1.01 |
| Extrusion Moldability | good | good | poor | medium | poor | good | good | good | good | medium |

Note:
*PP stands for polypropylene

**Extrusion was impossible.
***Mixing was impossible.

1) Specific Surface Area

The specific surface area of unmodified propylene polymers was measured with a surface area measuring apparatus Monosorb, manufactured by Yuasa-Ionics.

2) Heat Distortion Temperature

Measured in accordance with JIS K-7202 under a load of 1 kg and expressed in terms of Vicat point (° C.).

3) Rigidity

Measured in accordance with JIS K-7203.

4) Transparency

Transparency of a 300 μm thick sheet prepared by hot pressing was measured with a Hazemeter and represented as %.

5) Extrusion Molding Property

Degree of trouble occurring in an extruder and rated was as follows.

Good . . . No trouble occurred.
Medium . . . Slight trouble occurred.
Poor . . . Trouble occurred.

EXAMPLE 11

Three hundred parts of the modified propylene polymer obtained in Example 9 were premixed with 700 parts of a polybutylene terephthalate resin Planac M112, produced by Dainippon Ink & Chemicals, Inc., (hereinafter referred to as PBT resin) in a tumble mixer. The premix was fed to a twin-screw extruder, manufactured by Brabendar, having a diameter of 30 mm, equipped with a metering feeder, and set at a barrel temperature of 250° C. (feeder zone: 180° C.) and a die temperature of 250° C., and melt-kneaded at a screw speed of 20 rpm to obtain pellets of a polymer composition of the modified propylene polymer and PBT resin. The resulting pellets were injection molded in Model IS50AM at a resin temperature of 250° C. to prepare test specimens. Various physical properties of the polymer composition were measured using the test species. The results obtained are shown in Table 4.

Observation of the polymer composition under a scanning electron microscope revealed dispersed particles of 1 μm or less with good compatibility. The polymer composition, while somewhat inferior to the PBT resin in heat resistance and rigidity, exhibited great improvements over the PBT resin alone in specific gravity, notched impact resistance, and blow molding properties.

EXAMPLE 12

Three hundred parts of the modified propylene polymer obtained in Example 9 were premixed with 700 parts of a polyphenylene ether resin Asahi PPE R319, produced by Asahi Chemical Industry Co., Ltd., (hereinafter referred to as PPE resin) in a tumble mixer. The premix was fed to a twin-screw extruder, manufactured by Brabendar, having a diameter of 30 mm, equipped with a metering feeder, and set at a barrel temperature of 280° C. (feeder zone: 180° C.) and a die temperature of 250° C., and melt-kneaded at a screw speed of 20 rpm to obtain pellets of a polymer composition of the modified propylene polymer and PPE resin. The resulting pellets were injection molded in Model IS50AM at a resin temperature of 280° C. to prepare test specimens. Various physical properties of the polymer composition were measured using the test species. The results obtained are shown in Table 4.

The dispersed particles of the polymer composition were about 1 μm with good compatibility. The polymer composition, while somewhat inferior to PPE resin alone in heat resistance and rigidity, exhibited great improvements over PPE resin in molding processability and solvent resistance.

EXAMPLE 13

Three hundred parts of the modified propylene polymer obtained in Example 10 were premixed with 700 parts of a nylon resin MC112, produced by Kanebo, Ltd., (hereinafter referred to as nylon 6) in a tumble mixer. The premix was fed to a twin-screw extruder, manufactured by Brabendar, having a diameter of 30 mm, equipped with a metering feeder, and set at a barrel temperature of 250° C. (feeder zone: 180° C.) and a die temperature of 250° C., and melt-kneaded at a screw speed of 20 rpm to obtain pellets of a polymer composition of the modified propylene polymer and nylon 6. The resulting pellets were injection molded in Model IS50AM at a resin temperature of 250° C. to prepare test specimens. Various physical properties of the polymer composition were measured using the test species. The results obtained are shown in Table 4.

The dispersed particles of the polymer composition were about 1 μm with good compatibility. The polymer composition, while somewhat inferior to the nylon resin alone in heat resistance and rigidity, exhibited great improvements over nylon 6 in non-water absorbing properties, impact resistance, and blow molding properties.

TABLE 4

|  | Example 11 | Example 12 | Example 13 |
|---|---|---|---|
| Composition of Modified Polypropylene (part): | | | |
| Polypropylene | 900 | 900 | 940 |
| Styrene | 70 | 70 | 50 |
| Glycidyl methacrylate | 30 | 30 | — |
| Maleic anhydride | — | — | 10 |
| Composition of Polymer Alloy (part): | | | |
| Modified polypropylene | 300 | 300 | 300 |
| Nylon 6 | — | — | 700 |
| PBT resin | 700 | — | — |
| PPE resin | — | 700 | — |
| Characteristics: | | | |
| Blow molding properties | good | good | good |
| Melt viscosity (P) | 21000 | 26000 | 22000 |
| Surface condition | good | good | good |
| Rigidity (kg/cm$^2$) | 22300 | 25500 | 23100 |
| Heat distortion temperature (°C.) | 142 | 162 | 144 |
| Impact strength | 6.2 | 11.3 | 10.9 |

TABLE 4-continued

|  | Example 11 | Example 12 | Example 13 |
| --- | --- | --- | --- |
| (kg/cm) | | | |
| Water absorption (%) | 0.03 | 0.02 | 0.9 |

1) Blow Molding Properties

Molding Properties of the polymer composition in blow molding were evaluated by observing drawdown of the parison and difference in wall thickness between the upper and lower parts of a blown bottle and rated "good" or "bad".

2) Melt Viscosity

An apparent melt viscosity was measured with Capillograph 1B, manufactured by Toyo Seiki K.K., at a resin temperature of 250° C. and a shear rate of 100 sec$^{-1}$. As a measure for satisfactory molding, a melt viscosity of not lower than 10,000 poise is required.

3) Surface Condition

An molded test piece was immersed in toluene and occurrence of delamination was observed with the naked eye. A sample was rated "bad" or "good" according to whether or not delamination occurred.

4) Heat Distortion Temperature

Measured in accordance with JIS K-7202 under a load of 5 kg and expressed in terms of Vicat point (° C.). For use as a packaging vessel for microwave oven, the heat distortion temperature should be 130° C. or higher.

5) Rigidity

Measured in accordance with ASTM D790. The objective is $1.5 \times 10^4$ kg/cm$^2$.

5) Impact Strength

Measured in accordance with ASTM D256. The objective is 5 kg/cm at 23° C. (notched).

7) Water Absorption

A test piece (104×50×2 mm) was immersed in water at 23° C. for 120 hours. Water absorption is obtained according to equation:

Water Absorption (%)=(Weight After Water Absorption−Dry Weight)/(Dry Weight)×100

The objective is 2% or less.

According to the present invention, a particulate propylene polymer having a specific surface area can easily be impregnated with an aromatic vinyl monomer at ambient temperature to prepare a premix which has an increased vinyl monomer content and exhibits excellent feed to a melt-kneading apparatus, such as an extruder. Upon being melt-kneaded, the premix exhibits high reaction processability in an extruder to achieves a high polymerization rate and a high graft ratio of the vinyl monomer while showing excellent compatibility between the propylene polymer and the polymer of the vinyl monomer. Therefore, the resulting modified propylene polymer is a thermoplastic molding material providing a packaging material or a packaging vessel excellent in transparency, rigidity, and the like and of high practical utility.

When a co-rotating twin-screw extruder having a ratio of screw length (L) and screw diameter (D) of 30 or more is used for reaction processing of the premix, the amount of the modifying vinyl monomer can be increased, the premix exhibits excellent reaction processability in the extruder, and the resulting modified propylene polymer shows ensured compatibility. Therefore, the resulting modified propylene polymer is a thermoplastic molding material providing a packaging material or a packaging vessel excellent in transparency, rigidity, moisture resistance, and the like and of high practical utility.

While the invention has been described in detail and with reference to specific examples thereof, it will be apparent to one skilled in the art that various changes and modifications can be made therein without departing from the spirit and scope thereof.

What is claimed is:

1. A process for producing a modified propylene polymer comprising the steps of premixing a particulate propylene polymer having a specific surface area of 0.1 m$_2$/g or more with a vinyl monomer comprising styrene and polymerizing the vinyl monomer by heating, melting, and kneading the premix at a temperature of a melting point of the premix or higher of from 150° to 250° C. in an extruder.

2. The process as claimed in claim 1, wherein the specific surface area of the particulate propylene polymer is 0.2 m$^2$/g or more.

3. The process as claimed in claim 1, wherein the specific surface area of the particulate propylene polymer is 0.3 m$^2$/g or more.

4. The process as claimed in claim 1, wherein the vinyl monomer is an aromatic vinyl monomer.

5. The process as claimed in claim 1, wherein the vinyl monomer comprises an aromatic vinyl monomer and a vinyl monomer other than the aromatic vinyl monomer, in which the amount of the latter is the same as or less than that of the former.

6. The process as claimed in any of claims 1 to 5, wherein the vinyl monomer is used in an amount of 5% by weight or more based on the total weight of the propylene polymer and the vinyl monomer.

7. The process as claimed in claim 6, wherein the co-rotating twin-screw extruder has a ratio of a screw length (L) to a screw diameter (D) of from 40 to 70.

8. The process as claimed in claim 1, which comprises premixing a propylene polymer with a vinyl monomer and then using a co-rotating twin-screw extruder having a ratio of a screw length (L) to a screw diameter (D) of 30 or more.

9. The process as claimed in any one of claims 1 to 5 or 8, wherein the co-rotating twin-screw extruder has a ratio of a screw length (L) to a screw diameter (D) of from 40 to 70.

10. The process as claimed in claim 9, wherein the residual time in the co-rotating twin-screw extruder is 1 minute or more.

11. The process as claimed in any one of claims 1 to 5 or 8, wherein the residential time in the co-rotating twin-screw extruder is 1 minute or more.

12. The process as claimed in claim 11, wherein the residential time is from 3 to 10 minutes.

13. The process as claimed in any one of claims 1 to 5 or 8, wherein the residential time is from 3 to 10 minutes.

14. The process as claimed in claim 13, wherein the modified propylene polymer is a propylene polymer grafted with a polymer derived from a vinyl monomer.

15. A resin composition comprising a modified polypropylene polymer according to claim 13 and a resin selected from the group consisting of a polyamide resin, a polyester resin and a polyphenylene ether resin.

16. The process as claimed in any one of claims 1 to 5 or 8, wherein the modified propylene polymer is a propylene polymer grafted with a polymer derived from the vinyl monomer.

17. A resin composition comprising a modified polypropylene polymer according to any one of claims 1 to 5 or 8 and a resin selected from the group consisting of a polyamide resin, a polyester resin and a polyphenylene ether resin.

18. A modified propylene polymer composition obtained by mixing (a) a particulate propylene polymer having a specific surface area of 0.1 m²/g or more, (b) 5% by weight or more of a vinyl monomer mainly comprising an aromatic vinyl monomer based on the total weight of the vinyl monomer and the propylene polymer, and (c) a radical polymerization initiator, substantially impregnating the vinyl monomer and the radical polymerization initiator into the propylene polymer, and then polymerizing the vinyl monomer by melt-kneading.

19. The modified propylene polymer composition as claimed in claim 18, wherein the polymerization reaction is carried out by using a co-rotating twin-screw extruder having a ratio of a screw length (L) to a screw diameter (D) of 30 or more.

20. The modified propylene polymer composition as claimed in claims 18 or 19, wherein the modified propylene polymer is a propylene polymer grafted with a polymer derived from the vinyl monomer.

* * * * *